United States Patent [19]

Choe et al.

[11] 4,160,755

[45] Jul. 10, 1979

[54] PROCESS FOR PRODUCING ANISOTROPIC DOPES AND ARTICLES THEREOF FROM BENZOIC ACID DERIVATIVE POLYMERS

[75] Inventors: Eui W. Choe, Randolph; Marshall Tan, Ridgefield Park, both of N.J.; Robert M. Miniani, Charlotte, N.C.

[73] Assignee: Celanese Corporation, New York, N.Y.

[21] Appl. No.: 871,281

[22] Filed: Jan. 23, 1978

[51] Int. Cl.$^2$ ............... C08L 33/08; C08L 33/10
[52] U.S. Cl. ........................... 260/29.6 H; 264/205
[58] Field of Search ................. 260/29.6 H; 264/205

[56] References Cited

U.S. PATENT DOCUMENTS 3,344,127  9/1967  Masson .................... 526/240
3,899,382  8/1975  Matsuda et al. ............ 260/29.6 H

OTHER PUBLICATIONS

Amerik et al., *J. Polymer Sci.*, Part C, No. 23, pp. 231, 238, 1968.
Blumstein et al., *Macromolecules*, vol. 9, No. 2, 1976, pp. 243–247.

*Primary Examiner*—Maurice J. Welsh
*Attorney, Agent, or Firm*—Kenneth A. Genoni

[57] ABSTRACT

Anisotropic dopes having a polymer content of at least about 20% by weight of the dope are provided. The dope may be spun into fibers, extruded as films or utilized as a fracturing agent in subterranean formations. The preparation of the dope involves dissolving a polymer selected from the group consisting of polyacryloyloxybenzoic acid, polymethacryloyloxybenzoic acid, polyacryloylaminobenzoic acid, polymethacryloylaminobenzoic acid, and mixtures thereof in an aqueous solution containing a compound selected from the group consisting of Group I metal compounds and compounds containing a protonated amine group.

11 Claims, No Drawings

PROCESS FOR PRODUCING ANISOTROPIC DOPES AND ARTICLES THEREOF FROM BENZOIC ACID DERIVATIVE POLYMERS

BACKGROUND OF THE INVENTION

It is known in the art to produce high modulus organic fibers from linear polymers, such as aramids or wholly aromatic polyesters. These polymers, which can be utilized in solution or in melt form, exhibit nematic mesophase properties. That is, in the phase intermediate the liquid and solid phases of the polymer, the molecules are arranged in parallel lines. As a result of this molecular arrangement, the fibers possess highly anisotropic mechanical properties which is reflected by their high strength in the direction of molecular orientation but poor strength in all other directions. As a result of this weakness, the fibers tend to shred easily and have poor abrasion resistance.

A different class of mesophase forming polymers have recently been developed. These polymers are described as "comb polymers" since they possess mesophase forming side chains branching off a conventional backbone. The interaction of these side chains causes the polymer to exhibit smectic rather than nematic properties which alleviates some of th problems discussed above by adding an additional degree of order.

One such polymer, polymethacryloyloxybenzoic acid, is described in the following articles: Amerik et al, "polymerization of p-Methacryloyloxybenzoic Acid in Mesomorphic and in Liquid States", *J. Poly Sci.*, Part C., No. 23, pp. 231–238 (1968); Blumstein et al, "Polymerization of p-Methacryloyloxy Benzoic Acid With Liquid Crystalline Media", in *Liquid Crystals* 3, Part II, pp. 1075–1087 (Brown and Labes, Ed., Gordon and Breach Science Publishers, New York, N.Y., 1971); Blumstein et al, "Crystallinity and Order in Atactic Poly (acryloyloxybenzoic acid) and Poly (methacryloyloxybenzoic acid), *Macromolecules*, Vol. 9, No. 2, pp. 243–247 (March–April 1976); and Blumstein et al., "Oriented Polymer Growth in Thermotropic Mesophases", *Macromolecules*, Vol. 8, No. 1, pp. 73–76 (1975).

Unfortunately, the comb polymers are difficult to fashion into desired end products. For example, with the exception of ultra high molecular weight polymethacryloyloxybenzoic acid, the comb polymers yield an anisotropic melt which tends to decompose. While not all of the polymers decompose to the same extent, this feature makes it difficult to form end products from the polymer melt.

In commonly assigned U.S. Pat. application Ser. No. 871,282 filed concurrently herewith by Eui Won Choe entitled "Ultra-High Molecular Weight Polymethacryloyloxybenzoic Acid and Method of Preparation", there is described a polymer having a molecular weight corresponding to an inherent viscosity of at least about 1.0 when measured as a 0.2% solution in 2 N NaOH at 25° C. The method of preparation of this polymer is also described.

In commonly assigned U.S. Pat. application Ser. No. 871,280 filed concurrently herewith by Eui Won Choe, entitled "Polyacryloylaminobenzoic Acid, Polymethacryloylaminobenzoic Acid and Method of Preparation", there is described a polymer having a novel structure. The method of preparation of this polymer is also described.

The disclosures of each of the above two patent applications is hereby incorporated by reference.

The search has continued for improved processes for preparing anisotropic dopes which are useful in the production of fibers and films. This invention was made as a result of that search.

OBJECTS AND SUMMARY OF THE INVENTION

Accordingly, a general object of the present invention is to avoid or substantially alleviate the above problems of the prior art.

Another object of the present invention is to provide a novel, simple method of preparing an anisotropic dope from a select group of comb polymers.

A more specific object of the present invention is to prepare articles such as fibers and films from an anisotropic dope comprising a select group of comb polymers.

It is another object of the present invention to provide a method for preparing an anisotropic dope having a high solids content of a comb polymer.

It is a further object of the present invention to prepare anisotropic spinning dopes at high solids content in water from the comb polymer salts of sodium, triethylamine or ammonium hydroxide.

These and other objects, as well as the scope, nature and utilization of the invention will be apparent from the following summary and detailed description of the present invention.

In one aspect, the present invention comprises a process for preparing an anisotropic dope which is useful in the production of fibers and films. This process comprises: dissolving a polymer having recurring units of the formula

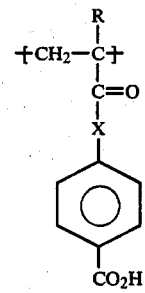

wherein R is hydrogen or methyl and X is oxygen or —NH, in an aqueous solution of at least one of the members of the group consisting of Group I metal compounds and compounds containing a protonated amine group.

In another aspect, the present invention comprises a process for preparing fibers and films from an anisotropic dope. This process comprises (a) dissolving a polymer having recurring units of the formula

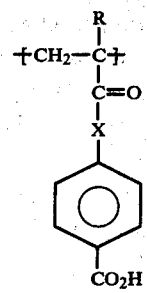

wherein R is hydrogen or methyl and X is oxygen or —NH, in an aqueous solution of at least one of the members of the group consisting of Group I metal compounds and compounds containing a protonated amine group, (b) extruding the dope, and (c) coagulating the dope.

In still another aspect, the present invention comprises an anisotropic dope useful in the preparation of fibers and films comprising an aqueous mixture of a polymer having recurring units of the formula

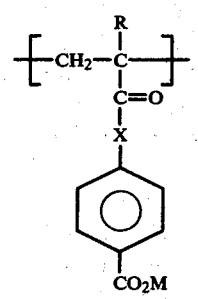

wherein R is hydrogen or methyl, X is oxygen or —NH and M is selected from the group consisting of Group I metals and protonated amine groups.

DESCRIPTION OF PREFERRED EMBODIMENTS

Polymer Synthesis

The comb polymers employed in the production of the anisotropic dopes of the present invention may be synthesized in any manner known to those skilled in this art and may possess low, intermediate or high molecular weight. For example, in the aforementioned Amerik et al article, p-methacryloyloxybenzoic acid (MBA) is disclosed as being prepared by the Schotten-Baumann reaction of methacrylyl chloride with the salt of p-oxybenzoic acid at low temperature in water and ethanol. Polymethacryloyloxybenzoic acid (PMBA) is prepared by dissolving the MBA monomer in dimethylformamide or p-cetyloxybenzoic acid, adding an initiator, and heating the reaction mixture. The reaction mechanism is believed to be as follows:

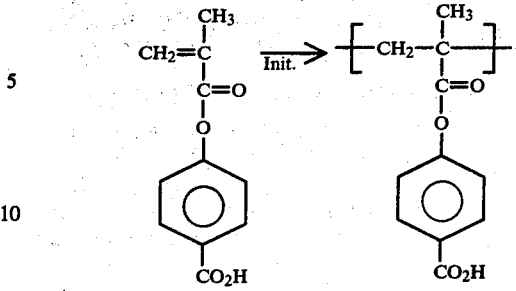

Polyacryloyloxybenzoic acid (PABA) may be synthesized by employing acrylylchloride, rather than methacrylyl chloride to produce the monomer. The polymerization reaction follows the same mechanism discussed above.

An alternate method of synthesizing PMBA is disclosed in the aforementioned U.S. Pat. application Ser. No. 871,282 to Eui Won Choe entitled, "Ultra-High Molecular Weight Polymethacryloyloxybenzoic Acid and Method of Preparation". As more fully described therein, the PMBA is produced via a free radical reaction of the MBA monomer at a relatively low temperature in an oxygen free, aqueous mixture containing an alkali metal compound and an initiator. The polymer is precipitated from the reaction mixture by adding a sufficient amount of a strong acid, separated from the reaction mixture, and washed. The reaction is believed to proceed according to the following mechanism:

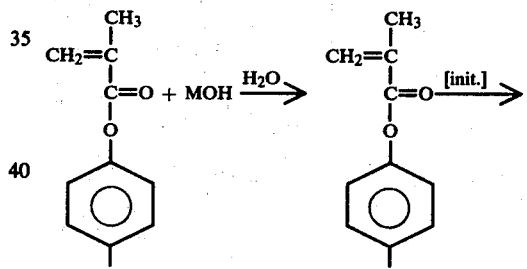

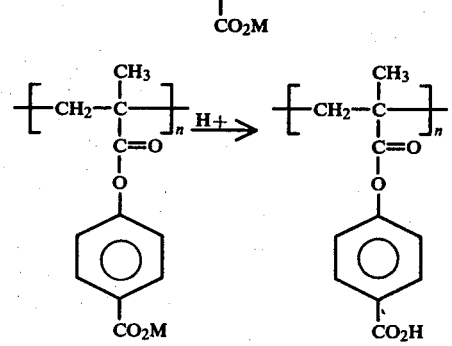

wherein M is an alkali metal, e.g. Li, K, Na, Cs, etc. The PMBA produced in this manner possesses a molecular weight far greater than that which can be obtained when the polymerization is carried out in either dimethylformamide or p-cetyloxybenzoic acid.

Polyacryloylaminobenzoic acid (PAABA) and polymethacryloylaminobenzoic acid (PMABA) may similarly be synthesized via the free radical reaction of the related monomer at a relatively low temperature in an oxygen free, aqueous mixture containing an alkali metal compound and a free radical initiator. This polymerization process is disclosed in the aforementioned U.S. Pat. application Ser. No. 871,280 to Eui Won Choe entitled "Polyacryloylaminobenzoic Acid, Polymethacryloylaminobenzoic Acid and Method of Preparation." As more fully discussed therein, the AABA or MABA monomer can be produced in any manner known to those skilled in this art, such as the method taught by U.S. Pat. No. 3,344,127, the disclosure of which is incorporated by reference. In essence, this process entails the addition of acrylyl chloride or methacrylyl chloride in chloroform to an agitated mixture of p-aminobenzoic acid and potassium carbonate. After a sufficient time has been allowed for polymerization to occur, the mixture is filtered to remove any undissolved material. The monomer is precipitated by adding concentrated hydrochloric acid, removed from the mixture by filtration, and recrystallized in a mixture of ether, water and acetone.

The AABA or MABA monomer can also be produced by reacting acrylyl chloride or methacrylyl chloride in N-methyl-2-pyrrolidone at $-25°$ C.

The polymerization mechanism is analogous to that shown above with respect to PMBA, the difference residing in the starting monomer.

The above monomers may be copolymerized with minor amounts of compounds, such as acrylic acid, to form copolymers which may be utilized to form the anisotropic dopes of this invention. Mixtures of the polymers and/or copolymers may also be used to form these dopes.

The following examples are given to illustrate the various methods in which the polymers that form the anisotropic dopes of this invention may be synthesized. It is to be understood, however, that the invention is not limited to the polymers formed in the following examples.

Examples 1-5 illustrate the synthesis of polyacryloyloxybenzoic acid, examples 6-15 illustrate the synthesis of polymethacryloyloxybenzoic acid, examples 16-23 illustrate the synthesis of polymethacryloyloxybenzoic acid via the free radical polymerization technique and example 24 illustrates the synthesis of polymethacryloylaminobenzoic acid.

ybenzoic acid (CBA) is formulated. To this mixture is added 0.036 grams (0.375% by weight based on the weight of the ABA) of di-t-butylperoxide. The reaction mixture is maintained at a temperature of 110° C. for two hours and then examined on a hot stage microscope. It is found that polymerization has not occurred. The reaction mixture is then heated at 180° C. for an additional hour and again examined. Polyacryloyloxybenzoic acid having an inherent viscosity of 0.036 in dimethylformamide (DMF) is found to have been synthesized.

The results of similar test runs (Examples 2-5) using different initiators and solvents are set forth in Table I. It will be noted that in example 5, low molecular weight PABA can be produced without an initiator via the thermal polymerization of ABA under vacuum.

TABLE I

Polymerization Of Acryloyloxybenzoic Acid In Liquid Crystalline Media

| Example | Solvent | Initiator | [C] | T°C. | Hrs. | I.V.dl/g |
|---|---|---|---|---|---|---|
| 1 | CBA | t-Bu$_2$O$_2$ | 0.375 | 110 | 2 | No Rx. |
| 2 | CBA | " | " | 180 | 1 | 0.036 (DMF) |
| 3 | DMF | t-BPB | 1 | 115 | 1 | 0.14 (DMF) |
| 4 | DMF | t-Bu$_2$O$_2$ | 0.375 | 110 | 1 | No Rx. |
| 5 | None | Thermal | — | 220 | 5 | 0.03 (NaOH) | t-Bu$_2$O$_2$ = di-t-butylperoxide
t-BPB = di-t-butylperbenzoate
[C] = % Concentration of Initiator Based on Monomer Weight
I.V. = Inherent Viscosity

EXAMPLE 6

A mixture of 10 grams of p-methacryloyloxybenzoic acid and 4.72 grams of DMF is heated at a temperature of 110° C. for one hour. PMBA having an inherent viscosity of 0.14 dl/g in DMF is found to have been synthesized.

The results of similar test runs using different solvent, initiators, initiator concentrations and temperatures are set forth in Table II. It will be noted that PMBA was produced without an initiator via the thermal polymerization of MBA under vacuum.

TABLE II

| Examples | Solvent | Initiator | [C]% | T°C. | Hrs. | I.V.* dl/q |
|---|---|---|---|---|---|---|
| 6 | DMF | t-Bu$_2$O$_2$ | 0.75 | 110 | 1 | 0.14 (DMF) |
| 7 | DMF | " | 0.386 | " | 1 | 0.15 (MDF) |
| 8 | DMF | t-BuPB | 1.0 | 115 | 1 | 0.14 |
| 9 | CBA | " | 1.0 | 110 | 1½ | No Rx. |
| 10 | CBA | " | 1.0 | 180 | ½ | 0.63-0.74 0.25 (NaOH) Repeat run 0.19 (NaOH) |
| 11 | CBA | " | 0.375 | 110 | 1½ | 0.32 |
|  | CBA | " | 0.375 | 180 | ½ |  |
| 12 | CBA | DiCupR | 0.375 | 110 | 1½ | 0.29 |
|  | CBA | DiCupR | 0.375 | 180 | ½ |  |
| 13 | CBA | " | 0.75 | 110 | 1½ | 0.23 |
|  | CBA | " | 0.375 | 180 | ½ |  |
| 14 | CBA | Thermal | — | 220 |  | 0.1 |
| 15 | None | Thermal | — | 220 |  | 0.1 (NaOH)X-linked |

*I.V. at 0.1% in DMF containing 1 mole % LiCl (except Example 15).
DiCupR = dicumylperoxide

EXAMPLES 1-5

An equimolar mixture of 9.61 grams p-acryloyloxybenzoic acid (ABA) and 18.13 grams of p-cetyloxy- The remaining abbreviations are defined in Table I.

The dual notation in Examples 11-13 indicates that the polymerization reaction temperature was maintained at about 110° C. for about 1½ hours and then raised to 180° C. for about ½ hour to yield a polymer having the indicated inherent viscosity.

EXAMPLE 16

Sodium methacryloyloxybenzoate is prepared by dissolving 10 grams of methacryloyloxybenzoic acid in 150 ml of the aqueous solution containing 1.94 grams of sodium hydroxide. Twelve milliliters of 2 N NaOH solution is added in order to obtain a clear solution. To this solution maintained at 0°-5° C. and under nitrogen is added 0.15 grams of potassium persulfate in 7 ml of water, followed after one minute by 0.075 grams of sodium bisulfite in 5 ml of water. After the mixture is maintained at that temperature for 10 hours, it is allowed to rise to room temperature and stirred for an additional 16 hours. The reaction mixture is acidified with 100 ml of 20% by weight hydrochloric acid to precipitate the polymer. The polymer is filtered, washed with water, and then dried at 120° C./0.1 mm Hg to yield 5.7 grams of polymethacryloyloxybenzoic acid with an inherent viscosity of 1.46 (0.2%, 2 N NaOH, 25°), and having a melting point of greater than 330° C.

The results of similar test runs involving different monomer concentrations, initiator concentrations and reaction temperatures are set forth in Table III.

TABLE III

| Example | (M)% | $K_2S_2O_8$ (*) | $NaHSO_3$ (*) | T°C. | I.V. dl/g (2N NaOH) |
|---|---|---|---|---|---|
| 16 | 5.4 | 1.5 | 0.75 | 0 | 1.46 |
| 17 | 5.4 | 1.5 | 0.75 | 25 | 0.82-1.06 |
| 18 | 9.25 | " | " | " | 1.05 |
| 19 | 19.23 | " | " | " | 0.75 |
| 20 | 5.4 | 1.0 | 0.50 | 0 | 1.18 |
| 21 | " | 2.0 | 1.00 | " | 1.04 |
| 22 | " | 1.5 | 0.75 | −10 | 1.12 |
| 23 | 9.25 | 1.5 | 0.75 | 0 | 1.30 |

(M)% = weight percent of monomer.
(%) Based on the monomer weight.

EXAMPLE 24

Sodium methacryloylaminobenzoic acid is prepared by dissolving 9.95 grams of methacryloylaminobenzoic acid in 152 ml of the aqueous solution containing 1.94 grams of sodium hydroxide. Twelve milliliters of 2 N NaOH solution is added in order to obtain a clear solution. To this solution maintained at 0° C.-5° C. and under nitrogen is added 1.5 grams of potassium persulfate in 7 ml of water, followed after one minute by 0.075 grams of sodium bisulfite in 5 ml of water. The monomer concentration in the reaction mixture is 5.4% by weight. After maintaining that temperature for 10 hours, it is allowed to rise to room temperature and stirred for an additional 16 hours. The reaction mixture is acidified with 100 ml of 20% hydrochloric acid to precipitate the polymer. The polymer is filtered, washed with water, boiled in glacial acetic acid and filtered, washed with water, and then dried at 120° C. and 0.1 mm Hg to yield 9.85 grams of polymethacryloylaminobenzoic acid with an inherent viscosity of 0.09 (determined as a 0.2% solution by weight in 2 N NaOH at 25° C.).

DOPE PREPARATION AND SPINNING

The anisotropic dopes of this invention are formed by dissolving the polymer in an aqueous solution containing a Group I metal compound or a compound containing a protonated amine group. Typical of these substances are triethylamine, ammonium hydroxide, sodium hydroxide, potassium hydroxide, lithium hydroxide and cesium hydroxide.

In solution, the dissolved polymer has repeating units of the formula

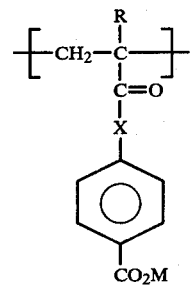

wherein R is hydrogen or methyl, X is oxygen or —NH and M is selected from the group consisting of Group I metals and protonated amine groups. The Group I metal compound or the compound containing a protonated amine group is present in the aqueous solution in an amount ranging from about 3% to about 50% and preferably from about 5% to about 30% by weight of the aqueous solution. The polymer is then added to this solution so that the dope contains polymer in an amount ranging from at least about 20% up to the saturation point of the solvent and preferably from about 24% to about 30% by weight.

The temperature of the solvent while the polymer is being added thereto is not critical to the formation of the dope. However, to enable the polymer to rapidly dissolve in the solvent and thus form a homogeneous mixture, a temperature of generally from about 30 to about 100° C., typically from about 30 to about 60° C., and preferably from about 35 to about 55° C. is desirable.

The dope prepared in this manner was determined to be anisotropic by viewing the dope between crossed polar lenses. When the aqueous solution contains sodium hydroxide, the dope was found to be reversibly shear thickening. The term "reversibly shear thickening" describes a dope which possesses a higher viscosity at higher shear rates but returns to a lower viscosity when the shear rate is lowered.

Fibers are formed from the dope by extruding the dope into an acidic coagulating bath. The type and amount of acid utilized in the bath and the bath temperature are not crucial to the formation of the fiber as long as it serves to coagulate the polymer. Acetic, sulfuric and hydrochloric acid have all been employed successfully.

The following examples are given as specific illustrations of the invention. It should be understood, however, that the invention is not limited to the specific details set forth in these examples.

EXAMPLE 25

Five grams of polymethacryloyloxybenzoic acid prepared according to Example 16 are dissolved in 12.12 grams of aqueous solution containing 2.5 grams of triethylamine to yield an anisotropic dope. Anisotropic dopes of poly(sodium methacryloyloxy benzoate) and poly(ammonium methacryloyloxy benzoate) are prepared similarly from the polymer and 2 N sodium hydroxide or ammonium hydroxide respectively.

EXAMPLE 26

Forty six grams of polymethacryloyloxybenzoic acid is dissolved in 138 grams of 21.2% triethylamine solution in water at 55° C. A clear homogeneous and anisotropic dope is obtained. The resulting dope is extruded through a 10×050μ spinnerette into a 20% sulfuric acid coagulating bath to form transparent fibers. The yarns coming out of the coagulating bath are passed through a roll with water wash and through another take-up unit to collect the yarn.

EXAMPLE 27

Example 26 is repeated with the exception that the coagulating bath is 15% acetic acid.

EXAMPLE 28

Fifty grams of polymethacryloyloxybenzoic acid is dissolved in 154 grams of 2 N NaOH solution at 45° C. A clear homogeneous dope is obtained. This dope has the characteristic of shear thickening. The fibers are obtained similarly to Examples 26 and 27 except that a coagulating bath of 5% acetic acid is used.

EXAMPLE 29

A 24% solids level dope of polymethacryloyloxybenzoic acid (1.11 I.V. in 2 N NaOH) is prepared in 2 N NaOH at 45° C. At low agitating speed, the dope is clear, homogeneous, and viscous, but at high shear rates the dope becomes rubber-like. The dope is reversibly shear thickening as observed in the dope preparation and measured on a Contraves viscometer. The resulting dope is spun at room temperature into a 5% acetic acid coagulating bath. In this example, however, the shear thickening characteristic of the dope caused a high pressure build up in the spinning pack.

EXAMPLE 30

In order to minimize the shear thickening phenomenon, another batch of polymethacryloyloxybenzoic acid dope is prepared in aqueous triethylamine solution rather than NaOH. At the 25% solids level the resulting dope is homogeneous, clear, and viscous. Fibers are spun into different coagulating baths such as 5%, 15%, 17.5% acetic acid, and 20% sulfuric acid, all at room temperature.

Anisotropic dopes of the other polymers may be prepared in a like manner by dissolving the desired polymer in the aqueous solution.

The fibers which are produced from the anisotropic dopes of this invention may be formed by wet, dry jet wet or dry spinning. The fibers are characterized by their transparency, high orientation and crystallinity as determined by x-ray analysis. These qualities are reflected in the fiber's high strength and resistance to fibrillation when compared to the known polymer fibers.

Although the invention has been described with preferred embodiments, it is to be understood that variations and modifications may be employed as will be apparent to those skilled in the art. Such variations and modifications are to be considered within the scope of the following claims.

We claim:

1. A process for preparing an anisotropic dope which is useful in the production of fibers and films comprising: dissolving a polymer having recurring units of the formula

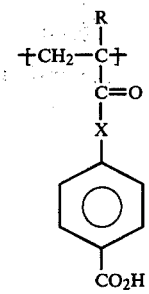

wherein R is hydrogen or methyl and X is oxygen or —NH, in an aqueous solution of at least one of the members of the group consisting of Group I metal compounds and compounds containing a protonated amine group.

2. The process of claim 1 wherein R is methyl and X is oxygen.

3. The process of claim 1 wherein the polymer is present in the dope in an amount of at least about 20% by weight of the total weight of dope.

4. An anisotropic dope useful in the preparation of fibers and films comprising an aqueous mixture of a polymer having recurring units of the formula

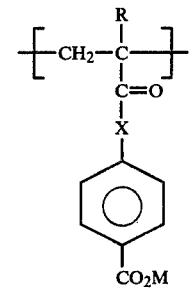

wherein R is hydrogen or methyl, X is oxygen and M is selected from the group consisting of Group I metals and protonated amine groups.

5. The anisotropic dope of claim 4 wherein R is methyl.

6. The anisotropic dope of claim 5 wherein M is sodium.

7. The anisotropic dope of claim 5 wherein M is triethylamine.

8. The anisotropic dope of claim 4 wherein the polymer is present in an amount of at least about 20% by weight of total weight of dope.

9. A process for preparing fibers and films from an anisotropic dope comprising:
(a) dissolving a polymer having recurring units of the formula

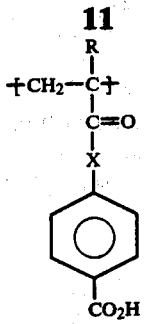

wherein R is hydrogen or methyl and X is oxygen or —NH, in an aqueous solution of at least one of the members of the group consisting of Group I metal compounds and compounds containing a protonated amine group, (b) extruding the dope, and
(c) coagulating the dope.

10. The process of claim 9 wherein R is methyl and X is oxygen.

11. The process of claim 9 wherein the polymer is present in an amount of at least about 20% by weight of total weight of dope.